US008199332B2

(12) United States Patent
Pahk et al.

(10) Patent No.: US 8,199,332 B2
(45) Date of Patent: Jun. 12, 2012

(54) APPARATUS FOR MEASURING THICKNESS

(75) Inventors: Heui-Jae Pahk, Seoul (KR); Woo-Jung Ahn, Gyeonggi-do (KR); Young-Min Hwang, Seoul (KR); Chang-Yeol Lee, Seoul (KR); Ji-Won Choi, Seoul (KR)

(73) Assignee: Snu Precision Co., Ltd., Seoul (KR)

( * ) Notice: Subject to any disclaimer, the term of this patent is extended or adjusted under 35 U.S.C. 154(b) by 90 days.

(21) Appl. No.: 12/677,355

(22) PCT Filed: Apr. 2, 2008

(86) PCT No.: PCT/KR2008/001841
§ 371 (c)(1),
(2), (4) Date: Mar. 10, 2010

(87) PCT Pub. No.: WO2009/102089
PCT Pub. Date: Aug. 20, 2009

(65) Prior Publication Data
US 2011/0001988 A1 Jan. 6, 2011

(30) Foreign Application Priority Data

Feb. 13, 2008 (KR) ...................... 10-2008-001-3051

(51) Int. Cl.
*G01B 11/02* (2006.01)
*G01B 11/28* (2006.01)
*G01N 21/00* (2006.01)
(52) U.S. Cl. ........................... 356/503; 356/73; 356/630
(58) Field of Classification Search ................ 356/73, 356/451, 503, 504, 630, 632
See application file for complete search history.

(56) References Cited

U.S. PATENT DOCUMENTS

| 5,087,121 | A  | * | 2/1992  | Kakuchi et al. | ................ | 356/73  |
| 6,137,575 | A  | * | 10/2000 | Sugiyama et al. | ............ | 356/503 |
| 6,462,826 | B1 |   | 10/2002 | Howard         |                  |         |
| 6,545,763 | B1 | * | 4/2003  | Kim et al.     | ..................... | 356/503 |

(Continued)

FOREIGN PATENT DOCUMENTS

JP    8159724 A    6/1996

(Continued)

OTHER PUBLICATIONS

Search Report for PCT/KR2008/001841 dated Oct. 31, 2008, 2 pages.

*Primary Examiner* — Michael A Lyons
(74) *Attorney, Agent, or Firm* — Dority & Manning, P.A.

(57) ABSTRACT

A thickness measurement apparatus includes a beam splitter for reflecting or transmitting a ray irradiated from an optical source or a ray reflected by a measurement object; a first lens part which condenses a ray to the measurement object and generates a reference ray; a second lens part for condensing a ray to the object to be measured; an interference light detector for detecting an interference signal generated by the reflected ray and reference ray; a spectroscopic detector corresponding to the second lens part to form a light path different from the path formed by the interference light detector and splits the ray reflected by the measurement object to detect an intensity and wavelength of each split ray; and a light path converter for selectively transmitting a ray to the interference light detector or spectroscopic detector, wherein position exchanging is performed between the first second lens parts.

5 Claims, 3 Drawing Sheets

U.S. PATENT DOCUMENTS

| | | | |
|---|---|---|---|
| 6,678,055 B2 * | 1/2004 | Du-Nour et al. | 356/504 |
| 7,057,735 B2 * | 6/2006 | Jasapara | 356/503 |
| 7,127,109 B1 | 10/2006 | Kim | |
| 7,710,579 B2 * | 5/2010 | Yamaguchi et al. | 356/503 |
| 7,869,057 B2 * | 1/2011 | De Groot | 356/511 |
| 2002/0048025 A1 * | 4/2002 | Takaoka | 356/497 |
| 2004/0160612 A1 * | 8/2004 | Grafe et al. | 356/632 |
| 2006/0244973 A1 | 11/2006 | Yun et al. | |

FOREIGN PATENT DOCUMENTS

| | | |
|---|---|---|
| JP | 2006162462 A | 6/2006 |
| JP | 2008020332 A | 1/2008 |
| KR | 20020060525 A | 7/2002 |
| KR | 100434445 B1 | 6/2004 |

* cited by examiner

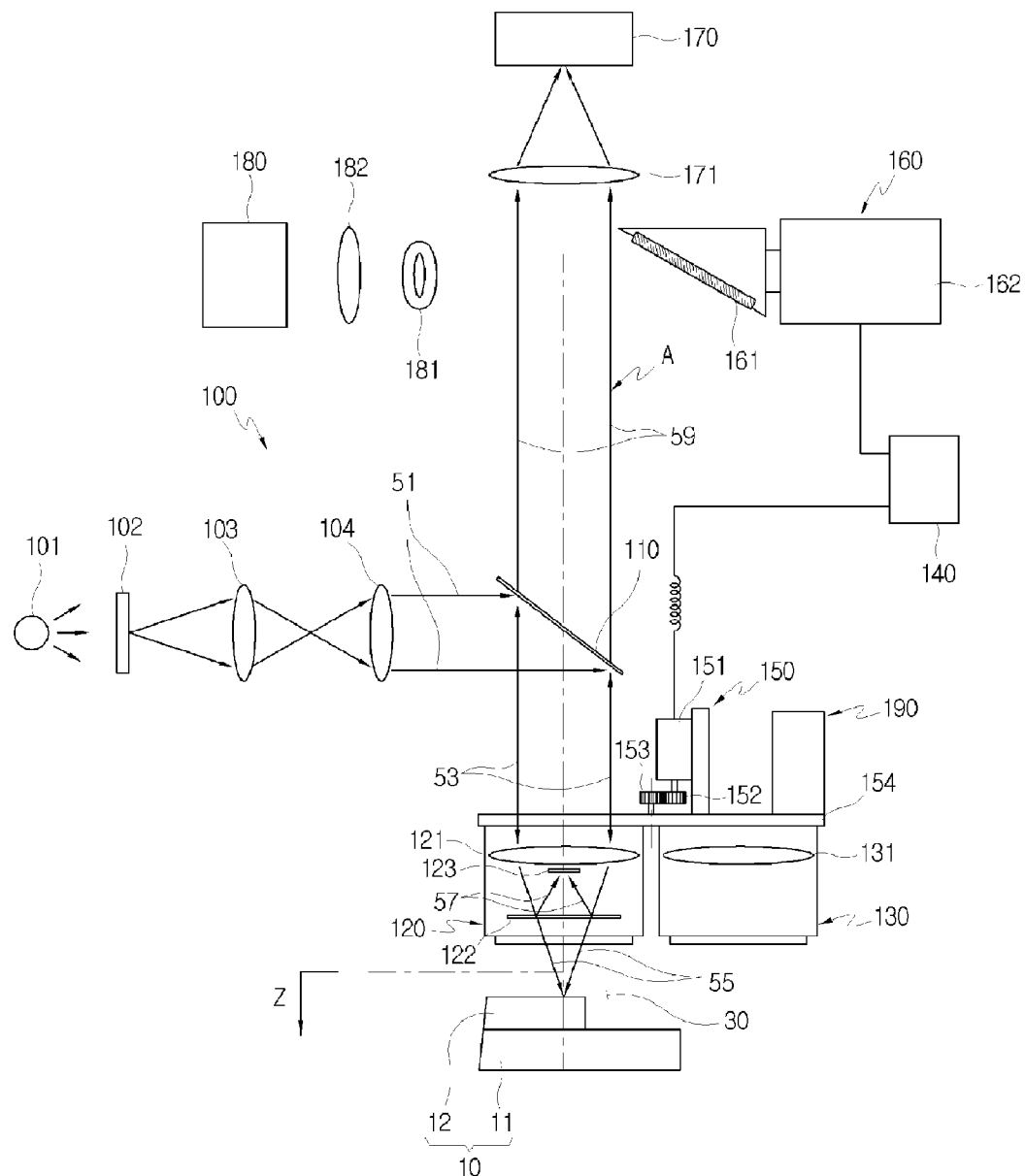
[Fig. 1]

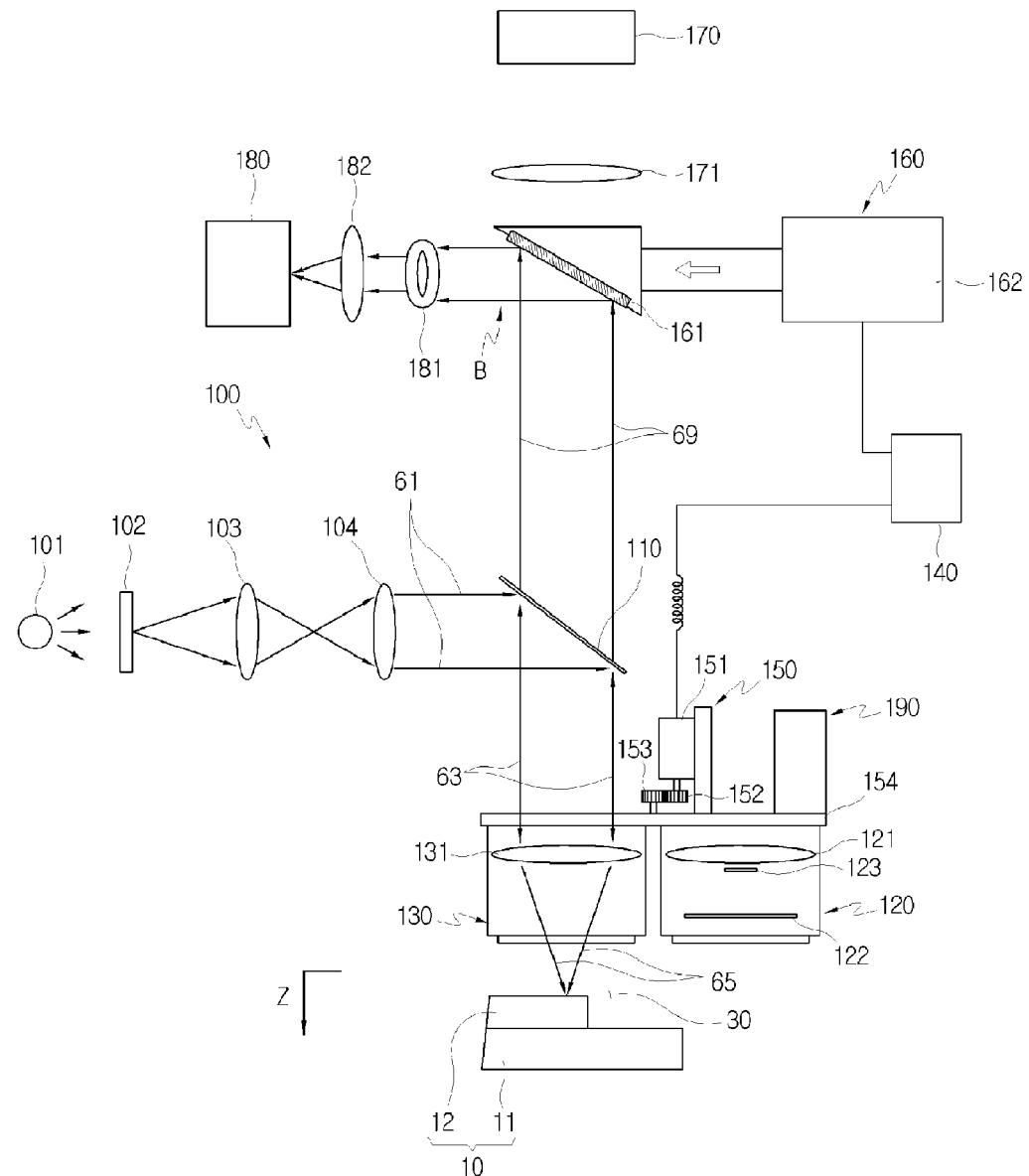
[Fig. 2]

[Fig. 3]
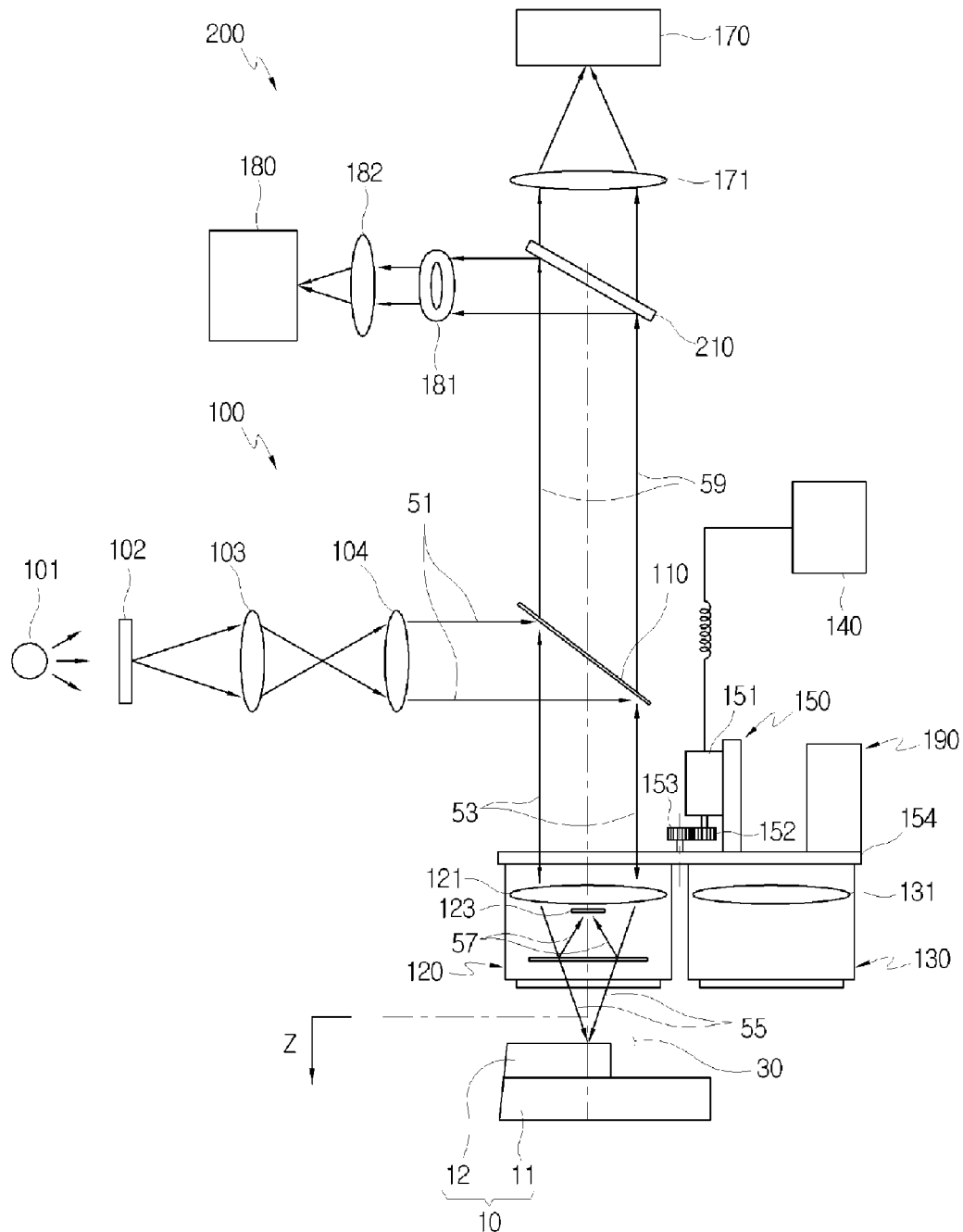

APPARATUS FOR MEASURING THICKNESS

CROSS REFERENCE TO RELATED APPLICATION

This application is the national stage entry of International Patent Application No. PCT/KR2008/001841 having a filing date of Apr. 2, 2008, which claims filing benefit of Korean Patent Application Number 10-2008-0013051 having a filing date of Feb. 13, 2008.

TECHNICAL FIELD

The present invention relates to an apparatus for measuring a thickness, and more particularly to an apparatus for measuring a thickness, which includes an interference light detector, a spectroscopic detector, and a light path converter for selectively transmitting a ray to one of the interference light detector and the spectroscopic detector so that the apparatus can accurately measure the thickness of a thin layer having a large variety of material and various thicknesses.

BACKGROUND ART

Among various factors influencing quality of a semiconductor or a FPD in a semiconductor process and a FPD process, it is important to control the thickness of a thin layer. Therefore, it is necessary to directly monitor the thickness of the thin layer during the processes. 'A thin layer' is a base layer, i.e. a layer formed on a surface of a substrate while having an extremely minute thickness, the thickness of the thin layer being within several tens of Å~several µm. In order to apply such a thin layer to a specific use, it is necessary to know the thickness, composition, and physical and optical characteristics of the thin layer. Particularly, it has recently become a general tendency to form multiple-super thin layers on a substrate so as to increase the degree of integration of a semiconductor device. In order to develop such a high integration semiconductor device, it is necessary to exactly control a property of a thin layer, including a thickness thereof, which is a factor exerting remarkable influence on its property. There are various methods for measuring the thickness of a thin layer used in a semiconductor process, an application process, etc. Among these methods, a method using an interferometer and a method using a spectroscopic detector are the most typical methods.

However, in a case where objects to be measured are made from non-transparent material, the method using an interferometer can measure the almost objects, and in a case where objects to be measured are made from transparent material, it is limited for the method using an interferometer to measure the objects. Particularly, in a case where a transparent thin layer stacked on a base layer has a sufficient thickness, it is possible to distinguish an interference signal generated by a ray reflected from a boundary surface between an air layer and a thin layer from an interference signal generated by a ray reflected from a boundary surface between the thin layer and a base layer so that the thickness can be measured. However, in a case where a transparent thin layer stacked on the base layer does not have a sufficient thickness, for example, in a case where it has a thickness below micrometer, both interference signals are overlapped so that it is impossible to measure the thickness of the thin layer.

Also, according to the method using a spectrophotometer, in a measurement object to be measured, thickness in only a specific point can be measured, and it is impossible to obtain a two-dimentional shape or a three-dimentional shape of the entire surface of the object.

DISCLOSURE OF INVENTION

Technical Problem

Accordingly, the present invention has been made to solve the above-mentioned problems occurring in the prior art, and the present invention provides an apparatus for measuring a thickness, which includes an interference light detector, a spectroscopic detector, and a light path converter for selectively transmitting a ray to one of the interference light detector and the spectroscopic detector so that the apparatus can accurately measure the thickness of a transparent thin layer having a thickness below micrometer, and can measure a thickness profile of a thin layer portion to be measured.

Technical Solution

In accordance with an aspect of the present invention, there is provided an apparatus for measuring a thickness, which includes: a first beam splitter for reflecting or transmitting a ray irradiated from an optical source or a ray reflected by a measurement object to the measured; a first lens part which condenses a ray to a measurement object to be measured and generates a reference ray having a difference of a light path in comparison with a ray reflected by the measurement object; a second lens part for condensing a ray to the measurement object; an interference light detector which corresponds to the first lens part so as to form a light path and detects an interference signal generated by the ray reflected by the measurement object and the reference ray; a spectroscopic detector which corresponds to the second lens part so as to form a light path different from the light path formed by the interference light detector and spectroscopically splits the ray reflected by the measurement object so as to detect an intensity and a wavelength of each split ray; and a light path converter for selectively transmitting a ray to one of the interference light detector and the spectroscopic detector, wherein position exchanging is performed between the first lens part and the second lens part.

In the apparatus for measuring a thickness, it is preferable that the light path converter includes a reflecting minor, which reflects a ray to one of the interference light detector and the spectroscopic detector, and a mirror driving part which moves the reflecting mirror so as to allow the reflecting mirror to be positioned at a light path or to be deviated from the light path.

The apparatus for measuring a thickness further includes a lens driving part allowing one of the first lens part and the second lens part to be selectively positioned at the light path and a controller controlling the mirror driving part and the lens driving part sequentially.

An apparatus for measuring a thickness, which includes: a first beam splitter for reflecting or transmitting a ray irradiated from an optical source or a ray reflected by a measurement object; a first lens part which condenses a ray to the measurement object and generates a reference ray having a difference of a light path in comparison with a ray reflected by the object to be measured; a second lens part for condensing a ray to the measurement object; an interference light detector which corresponds to the first lens part so as to form a light path and detects an interference signal generated by the ray reflected by the measurement object and the reference ray; a spectroscopic detector which corresponds to the second lens part so as to form a light path different from the light path formed by the interference light detector and spectroscopically splits the ray reflected by the measurement object so as to detect an intensity and a wavelength of each split ray; and a third beam splitter for distributing and transmitting a ray to the interference light detector and the spectroscopic detector, wherein position exchanging is performed between the first lens part and the second lens part.

The apparatus for measuring a thickness further includes a lens driving part allowing one of the first lens part and the second lens part to be selectively positioned at a light path.

The apparatus for measuring a thickness further includes at least one of a pinhole and a condenser lens, which is disposed at a light path between the light path converter and the spectroscopic detector.

In the apparatus for measuring a thickness, it is preferable that the first lens part includes a first condenser lens for condensing a ray to the measurement object, a second beam splitter for reflecting or transmitting an incident ray from the first condenser lens, and a reference minor for reflecting a ray entering from the second beam splitter to the second beam splitter again.

Advantageous Effects

According to the present invention, an apparatus for measuring a thickness, which measures the thickness of a transparent thin layer having a thickness below micrometer by a spectroscopic detector, and also measured a thickness profile of a thin layer part to be measured by using the spectroscopic detector, so that the apparatus can increase its effectiveness as an single apparatus and can reduce cost required for an additional device.

Also, the present invention provides an apparatus for measuring a thickness, which further includes a lens driving part allowing one of a first lens part and a second lens part to be selectively positioned at a light path, so that the apparatus can automatically perform position exchanging between the first lens part and the second lens part.

Also, the present invention provides an apparatus for measuring a thickness, which further includes a controller controlling a mirror driving part and a lens driving part sequentially so that although a separate signal for driving the lens driving part isn't applied, the lens driving part is driven by a driving signal from the mirror driving part.

BRIEF DESCRIPTION OF THE DRAWINGS

FIG. 1 is a view illustrating a state where a ray enters an interference light detector in a thickness measuring apparatus according to an embodiment of the present invention;

FIG. 2 is a view illustrating a state where a ray enters a spectroscopic detector in the thickness measuring apparatus for measuring a thickness according to an embodiment of the present invention, which is shown in FIG. 1; and FIG. 3 is a view illustrating a thickness measuring apparatus according to another embodiment of the present invention.

BEST MODE FOR CARRYING OUT THE INVENTION

Hereinafter, an exemplary embodiment of the present invention will be described with reference to the accompanying drawings.

FIG. 1 is a view illustrating a state where a ray enters an interference light detector in a thickness measuring apparatus according to an embodiment of the present invention, and FIG. 2 is a view illustrating a state where a ray enters a spectroscopic detector in the thickness measuring apparatus for measuring a thickness according to an embodiment of the present invention, which is shown in FIG. 1.

With reference to FIGS. 1 and 2, the thickness measuring apparatus 100 is an apparatus including a spectroscopic detector as well as an interference light detector. The thickness measuring apparatus includes a first beam splitter 110, a first lens part 120, a second lens part 130, an interference light detector 17, a spectroscopic detector 180, a light path converter 160, a lens driving part 150, and a controller 140.

The thickness measuring apparatus 100 includes a white optical source 101, and a lamp having various kinds of sources, such as a halogen lamp, etc., may be used as the white optical source 101. An ND filter (Neutral Density filter) 102 is included so as to reduce only brightness while remaining a spectrum characteristic of an incident ray from the white optical source 101. The thickness measuring apparatus 100 includes a condenser lens 103 for condensing the ray passed through the ND filter 102, and the ray passed through the condenser lens 103 passes through a collimator 104 for making the ray a parallel ray.

The first beam splitter 110 reflects or transmits the ray 51 passed through the collimator 104. The ray 53 reflected by the first beam splitter 110 enters the first lens part 120 or the second lens part 130. The first beam splitter 110, which has the proportion of reflectivity to transmissivity is 50:50, is used in the present embodiment.

The first lens part 120 collects rays into a measurement object 10 to be measured, and is used so as to generate a reference ray having a difference of a light path in comparison with a ray reflected by the measurement object 10. The first lens part 120 includes a first condenser lens 121, a second beam splitter 122, and a reference mirror 123.

The first condenser lens 121 is used for condensing ray into the measurement object 10, an incident ray from the first beam splitter 110 passes thrash the first condenser lens 121 and progresses toward the second beam splitter 122, which will be described below.

The second beam splitter 122 reflects or transmits the ray passed thrash the first condenser lens 121. A ray 57 reflected by the second beam splitter 122 is irradiated toward the reference minor 123. The ray 55 transmitted through the second beam splitter 122 is condensed into the measurement object 10, and is again reflected by the measurement object 10. The second beam splitter 122, which has the proportion of reflectivity to transmissivity is 50:50, is used in the present embodiment.

The reference mirror 123 is used for generating a reference ray having a difference of a light path in comparison with a ray reflected by the measurement object 10, and is positioned between the first condenser lens 121 and the second beam splitter 122. The reference minor 123 again reflects the ray 57 entering from the second beam splitter 122 toward the second beam splitter 122.

The second lens part 130 is used for condensing a ray into the measurement object 10, and includes a second condenser lens 131. The second condenser lens 131 allows a ray 63 entering from the first beam splitter 110 to progress toward the measurement object 10.

The interference light detector 170 corresponds to the first lens part 120 so as to form a light path A, and detects an interference signal generated by a ray reflected by the measurement object 10 and a reference ray. An interference ray 59 passed through the first lens part 120 passes thrash the first beam splitter 110 and enters the interference light detector 170. In general, a CCD (charge coupled device) camera having the number of pixels, which are suitable for an area to be measured, is used as the interference light detector 170. A condenser lens 171 for condensing the interference ray 59 entering from the first beam splitter 110 is disposed at a front part of the interference light detector 170.

The spectroscopic detector 180 corresponds to the second lens part 130 so as to form a light path B different from the light path A formed by the interference light detector 170, and spectroscopically splits a ray reflected by the measurement object 10 so as to measure an intensity and a wavelength of each split ray. With reference to FIG. 2, a reflecting ray 69 passes through the second lens part 130 passes by the first beam splitter 110, is reflected by the reflecting minor 161 while changing its own path, and enters the spectroscopic detector 180. In the present embodiment, a polychromator using a diffraction grating, which is a beam splitting device, and a photo diode array is used as the spectroscopic detector 180. It is possible to rapidly obtain data regarding wavelengths in the entire range from an ultraviolet ray to a visible ray (200~1000 nm) by using the polychromator, and it is also possible to simultaneously measure multiple elements showing different properties in each wavelength so as to fix the quantity thereof. A pinhole 181 and a condenser lens 182 are disposed at a light path between the light path converter 160, which will be described, and the spectroscopic detector 180 so as to allowing a ray led to the spectroscopic detector 180 to be easily condensed.

The light path converter 160 is used for selectively transmitting a ray to one of the interference light detector 170 and the spectroscopic detector 180, and includes a reflecting mirror 161 and a minor driving part 162. The reflecting mirror 161 reflects an incident ray while changing the path of the incident ray about 90 degrees, and has a reflectivity more than 99%. The mirror driving part 162 moves the reflecting minor 161 so as to allow the reflecting mirror 161 to be positioned at a light path or to escape from the light path. A pneumatic cylinder mirror may be sued as the driving part 162 in the present embodiment.

The lens driving part 150 performs a position exchange between the first lens part 120 and the second lens part 130 on the light path, and includes a driving motor 151, a driving gear 152, and a driven gear 153. The driving gear 152 is coaxially assembled with the driving motor 151 generating rotational driving force. The driven gear 153 is assembled with the supporting member 154, at which the first lens part 120 and the second lens part 130 are installed, and is also engaged with the driving gear 152. The rotational driving force generated in the driving motor 151 is transferred to the driven gear 153 thrash the driving gear 152.

The controller 140 controls the mirror driving part 162 and the lens driving part 150 sequentially. As shown in FIG. 1, when a rod of a cylinder moves back so that the reflecting mirror 161 is deviated from the light path, a signal from a sensor installed at the minor driving part 162 is inputted into the controller 140, and the controller 140 transmits the signal to the lens driving part 150 so as to allow the first lens part 120 to be positioned at the light path. On the other hand, as shown in FIG. 2, when the rod of the cylinder moves frontward so that the reflecting mirror 161 is positioned at the light path, a signal of a sensor installed at the mirror driving part 162 is inputted to the controller 140, and the controller 140 transmits the signal to the lens driving part 150 so as to allow the second lens part 130 to be positioned at the light path.

Also, the thickness measuring apparatus 100 includes a driving part 190 for obtaining an interference signal while moving with a very small interval in a direction crossing the measurement object 10 with respect to a measurement point, i.e. in the optical axial direction. The first lens part 120 and the second lens part 130 are mounted at the driving part 190 so that the first lens part 120 or the second lens part 130 can be moved in the optical axial direction by operation of the driving part 190. Herein, an optical axial direction vertically incident to the measurement object 10 refers to a z-direction shown in FIG. 1.

As such, the first lens part 120 or the second lens part 130 is moved upward/downward of the measurement point along the z-direction with an interval of several tens of nm so that a position where a strong interference signal is detected through the interference light detector 170 or the interference light detector 170 is found.

Hereinafter, the operational theory of thickness measuring apparatus 100 according to the present invention, which is structured as described above, will be approximately illustrated with reference to FIGS. 1 and 2.

Firstly, in order to measure a thickness of a thin layer 12 according to the theory of an interferometer, as shown in FIG. 1, a rod of a cylinder is moved back so that the reflecting mirror 61 is deviated from the light path, and the first lens part 120 is positioned at the light path.

The ray 51, which has been emitted from the white optical source 101 and passed thrash the collimator 104, is divided into a reflecting ray 53 and a transmitting ray by the first beam splitter 110, and the reflecting ray 53 enters the first lens part 120. The ray 53 passes thrash the first condenser lens 121, and a ray entering from the first condenser lens 121 to the second beam splitter 122 is again divided into a reflecting ray 57 and a transmitting ray 55 by the second beam splitter 122. The ray 55, as a measuring ray, is irradiated to the measurement object 10, and the reflecting ray 57, as a reference ray, is irradiated to the reference minor 123. The reference ray 57 reflected from the reference mirror 123 is again reflected by the second beam splitter 122 and progresses toward the first beam splitter 110. The measuring ray 55 reflected from a boundary surface between the thin layer 12 and the base layer 11 is transmitted through the second beam splitter 122 and progresses toward the first beam splitter 110. The reference ray 57 and the measuring ray 55 are concentrated so as to form an interference ray 59, and the interference ray 59 passes through the condenser lens 171 so as to enter the interference light detector 170.

Meanwhile, in order to measure a thickness of the thin layer 12 according to the theory of a spectrophotometer, as shown in FIG. 2, it is intended that a rod of a cylinder is moved frontward so that the reflecting minor 161 is positioned at the light path, and the second lens part 130 is positioned at the light path.

A ray 61, which has been emitted from the white optical source 101 and passed thrash the collimator 104, is divided into a reflecting ray 63 and a transmitting ray by the first beam splitter 110, and the reflecting ray 63 enters the second lens part 130. The reflecting ray 63 passes through the second condenser lens 131 so as to be irradiated to the measurement object 10. At this time, the ray 65 irradiated to the measurement object 10 is reflected to a boundary surface between the air layer 30 and the thin layer 12 and a boundary surface between the thin layer 12 and the base layer 11, respectively, so as to progress toward the first beam splitter 110. A ray reflected from the boundary surface between the air layer 30 and the thin layer 12 and a ray reflected from the boundary surface between the thin layer 12 and the base layer 11 are collected so as to form an interference ray 69, and the interference ray 69 is reflected by the reflecting mirror 161 and passes thrash the pinhole 181 and the condenser lens 182 so as to enter the spectroscopic detector 180.

MODE FOR THE INVENTION

Meanwhile, FIG. 3 is a view illustrating a thickness measuring apparatus according to another embodiment of the present invention. In FIG. 3, the members designated by the same reference numerals as the member as shown in FIGS. 1 and 2 has the same structures and functions, the detail description of each member will be omitted.

With reference to FIG. 3, the thickness measuring apparatus 200 according to the present embodiment includes a third beam splitter 210 instead of the light path converter 160.

The third beam splitter 210 performs a function for distributing an incident ray into rays so as to transmit the rays to the interference light detector 170 and the spectroscopic detector 180, respectively. In the embodiment shown in FIG. 1, a ray reflected by the measurement object 10 passes through the first beam splitter 110 and enters the interference light detector 170 or the spectroscopic detector 180 according to the location of the reflecting mirror 161. Meanwhile, in the thickness measuring apparatus 200 according to the embodiment, a ray reflected by the measurement object 10 passes through the first beam splitter 110 and is split into rays by the third beam splitter 210 so that the split rays simultaneously enter the interference light detector 170 and the spectroscopic detector 180.

At this state, a thickness of the thin layer 12 can be measured by performing a desired function among the functions of the interferometer and the spectrophotometer while position exchanging between the first lens part 120 and the second lens part 130 is performed. Differently from the embodiment shown in FIG. 1, the controller 140 in the present embodiment performs a function for controlling the lens driving part 150, A signal outputted from the controller 140 is inputted to the lens driving part 150 so as to allow the first lens part 120 and the second lens part 130 to be positioned at light path.

The thickness measuring apparatus according to the present embodiment, which is structured as described above, does not need the light path converter for selectively transmitting a ray to the interference light detector or the spectroscopic detector. Therefore, there is an advantage in that the apparatus can be simply structured.

In the embodiment shown in FIG. 1, although the lens driving part for performing position exchanging between the first lens part and the second lens part is illustrated, it is also possible that the user performs position exchanging between the first lens part and the second lens part through a hand-operation in a state where the lens driving part doesn't need to be installed.

The scope of the present may not be limited to the described embodiments and modified embodiments. It will be understood by those skilled in the art that various changes in form and details may be made therein without departing from the spirit and scope of the invention as defined by the appended claims.

INDUSTRIAL APPLICABILITY

In a thickness measuring apparatus according to the present embodiment, which is structured as described above, both of an interference light detector and a spectroscope detector are included in a single apparatus. In order to measure the thickness of a transparent thin layer having a thickness below micrometer, the spectroscopic detector is used, and in order to measure the thickness profile of the thin layer part to be measured, the interference light detector is used. Accordingly, the apparatus can increase its effectiveness as a single apparatus and can reduce cost required for an additional device.

Also, the thickness measuring apparatus according to the present embodiment further includes a lens driving part allowing one of the first lens part and the second lens part to be selectively positioned at a light path, thereby obtaining an effect in automatically performing position exchanging between the first lens part and the second lens part.

Also, the thickness measuring apparatus according to an embodiment further includes a controller controlling a minor driving part and a lens driving part sequentially. Therefore, there is an advantage in that the lens driving part is driven by a driving signal of the mirror driving part without a need for transmitting a additional signal for driving the lens driving part.

The invention claimed is:

1. An apparatus for measuring a thickness, comprising: a first beam splitter for reflecting or transmitting a ray irradiated from an optical source or a ray reflected by a measurement object to the measured; a first lens part which condenses a ray to the measurement object and generates a reference ray having a difference of a light path in comparison with a ray reflected by the measurement object; a second lens part for condensing a ray to the measurement object; an interference light detector which corresponds to the first lens part so as to form a light path and detects an interference signal generated by the ray reflected by the measurement object and the reference ray; a spectroscopic detector which corresponds to the second lens part so as to form a light path different from the light path formed by the interference light detector and splits the ray reflected by the measurement object so as to detect an intensity and a wavelength of each split ray; and a light path converter for selectively transmitting a ray to one of the interference light detector and the spectroscopic detector, wherein the light path converter includes a reflecting mirror, which reflects a ray to one of the interference light detector and the spectroscopic detector, and a mirror driving part which moves the reflecting mirror so as to allow the reflecting mirror to be positioned at a light path or to be deviated from the light path, wherein position exchanging is performed between the first lens part and the second lens part.

2. The apparatus as claimed in claim 1, further comprising a lens driving part allowing one of the first lens part and the second lens part to be selectively positioned at the light path and a controller controlling the mirror driving part and the lens driving part sequentially.

3. The apparatus as claimed in claim 1, further comprising a lens driving part allowing one of the first lens part and the second lens part to be selectively positioned at a light path.

4. The apparatus as claimed in claim 1, further comprising at least one of a pinhole and a condenser lens, which is disposed at a light path between the light path converter and the spectroscopic detector.

5. The apparatus as claimed in claim 1, wherein the first lens part includes a first condenser lens for condensing a ray to the measurement object, a second beam splitter for reflecting or transmitting an incident ray from the first condenser lens, and a reference mirror for reflecting a ray entering from the second beam splitter to the second beam splitter again.

* * * * *